(12) United States Patent
Kanzler

(10) Patent No.: US 10,247,472 B2
(45) Date of Patent: Apr. 2, 2019

(54) SUPPORT FOR A PACKING COLUMN

(71) Applicant: LINDE AKTIENGESELLSCHAFT, Munich (DE)

(72) Inventor: Karlmann Kanzler, Altötting (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 63 days.

(21) Appl. No.: 15/528,783

(22) PCT Filed: Nov. 26, 2015

(86) PCT No.: PCT/EP2015/002378
§ 371 (c)(1),
(2) Date: May 23, 2017

(87) PCT Pub. No.: WO2016/087031
PCT Pub. Date: Jun. 9, 2016

(65) Prior Publication Data
US 2017/0328633 A1 Nov. 16, 2017

(30) Foreign Application Priority Data
Dec. 2, 2014 (EP) .................................... 14004058

(51) Int. Cl.
| *F25J 3/04* | (2006.01) |
| *B01D 3/32* | (2006.01) |
| *B01J 19/30* | (2006.01) |
| *E04C 3/02* | (2006.01) |
| *E04C 3/04* | (2006.01) |

(52) U.S. Cl.
CPC .......... *F25J 3/04909* (2013.01); *B01D 3/326* (2013.01); *B01J 19/305* (2013.01); *E04C 3/02* (2013.01); *E04C 2003/0421* (2013.01); *E04C 2003/0426* (2013.01); *E04C 2003/0452* (2013.01)

(58) Field of Classification Search
CPC .......... B01D 3/326; B01J 19/305; E04C 3/02; E04C 2003/0421; E04C 2003/0426; E04C 2003/0452; F25J 3/04909
USPC .................................................. 261/108, 111
See application file for complete search history.

(56) References Cited

U.S. PATENT DOCUMENTS

| 984,660 | A | * | 2/1911 | Haas | |
| 1,394,605 | A | * | 10/1921 | Burhorn | F28C 1/02 |
| | | | | | 261/111 |

(Continued)

FOREIGN PATENT DOCUMENTS

| CH | 643907 | 6/1984 |
| DE | 311788 | 4/1919 |
| WO | WO 0206601 A1 | 1/2002 |

*Primary Examiner* — Charles S Bushey
(74) *Attorney, Agent, or Firm* — Millen White Zelano & Branigan, PC

(57) ABSTRACT

A support for a packing column having a support profile with a web section running in the vertical direction and having lower end and an upper end, and having a larger vertical extension than a horizontal extension. The support also has a foot section connected to the upper end of the web section and a head section connected to the lower end of the web section. The head section has an upper face and a sub-section, the width of the upper face being smaller than width of the sub-section and also smaller than the width of the foot section. The support enables a reduced support height and less coverage.

22 Claims, 3 Drawing Sheets

(56) References Cited

U.S. PATENT DOCUMENTS

Figure 1:
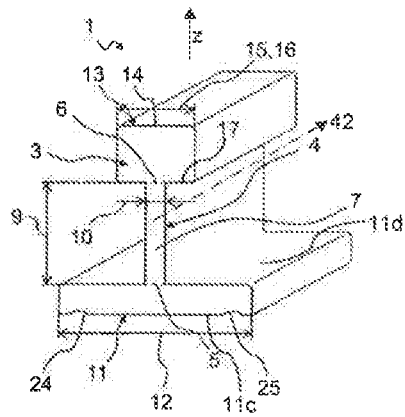

| | | | |
|---|---|---|---|
| 3,016,234 A * | 1/1962 | Huppmeier | B01D 3/22 |
| | | | 261/111 |
| 3,642,258 A | 2/1972 | Stahl et al. | |
| 4,028,442 A | 6/1977 | Eckert | |
| 5,069,830 A | 12/1991 | Moore et al. | |
| 2004/0206617 A1 | 10/2004 | Diehl et al. | |
| 2012/0228251 A1 * | 9/2012 | Headley | B01D 3/326 |
| | | | 211/124 |
| 2014/0264970 A1 * | 9/2014 | Bickerstaff | E04H 5/12 |
| | | | 261/108 |

\* cited by examiner

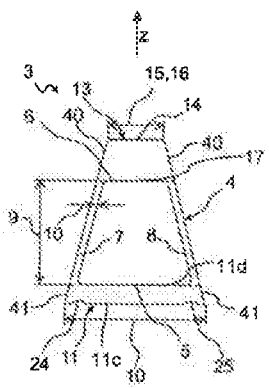
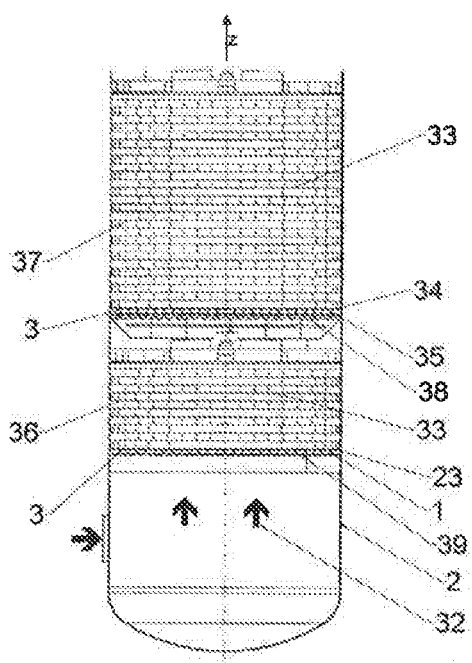

SUPPORT FOR A PACKING COLUMN

The invention relates to a support for a supporting grid or supporting collector in a packing column, and also to a packing column, preferably for the treatment of a gas or a two-phase fluid, preferably for gas separation or for air separation.

Such a support is designed to extend freely over a number of bearers, generally between two bearers, or on one annular bearer and to accept a load, generally the vertical load of a weight. Depending on the height of the load and the length of the free extent, supporting profiles that have a high area moment of inertia in the loading direction must be used. Reference will be made hereinafter to the simplified modeling customary in mechanics for the calculation of the area moment of inertia (I). The decisive factors in this case are the geometry of the supporting profile and its alignment in relation to the loading. In this case, the dimension in the loading direction is referred to as the height (h) and the dimension transverse to the loading direction is referred to as the width (b). In this case, the height (h) is raised to the third power and the width (b) is taken as the value itself or the height (h) is raised to the second power and the (sub-) area (A=h×b) is taken as its respective dimensions, so that for example the following formula applies to a simple square profile:

$$I = \frac{h^3 b}{12}. \qquad i$$

In the prior art, therefore, T-shaped profiles of a great height were often used. This has the disadvantage however that the overall height of a packing column becomes very great. Alternatively, cross profiles were used, which however are firstly very expensive and secondly require slots on a liquid collector arranged thereunder, which is arranged for catching a liquid. The slots must be milled in with great effort and cost. Other known profiles are not suitable for the vertical flow in a packing column, because as a result of their great width in the bearing region of the packings they inadmissibly cover many flow channels of the packings and consequently reduce the efficiency of the packing column.

Against this backgound, the present invention is based on the object of at least partially overcoming the disadvantages known from the prior art. The features according to the invention and advantageous refinements are described herein.

The features of the invention may be combined in any technically appropriate way, it also being possible for this purpose to use the explanations from the following description and also features from the figures, which comprise supplementary refinements of the invention.

The object on which the invention is based is achieved by a support for a packing column, the support having a supporting profile with at least the following elements:
- a web section running in the vertical direction with a first, lower end and a second, upper end, the web section having in particular a greater (vertical) height than (horizontal) width, and in particular the neutral axis of the supporting profile running through the web section;
- a foot section (also referred to as the lower flange) of a first width, the foot section adjoining the first end of the web section;
- a head section with an upper side and a sub-section lying opposite the upper side in the form of an underside of the head section, the head section on the upper side having a second width, and the sub-section of the head section having a third width, and the head section having a trapezoidal cross section, the second width being less than the third width.

The second width may also be less than the first width.

With reference to a support in operation or a support arranged as intended, the web section extends from the foot section upward in the vertical direction to the head section. The widths described herein all extend—with reference to the support arranged as intended—in the horizontal direction. The heights described herein extend—with reference to the support arranged as intended—in the vertical direction. Furthermore, the support extends—with reference to an arrangement as intended of the support—preferably along a longitudinal axis that runs along the horizontal.

The support is designed to extend freely over a plurality of bearers, generally two bearers, or one annular bearer, and thereby accept a load, generally the vertical load of a weight. For this purpose, the support has a supporting profile, which has on the one hand a high area moment of inertia in the loading direction and on the other hand a low coverage for an outlet area for a fluid, preferably a liquid, in the loading direction. Here, the main loading in design terms is assumed as loading with the associated loading direction and further loads, in particular transverse loads, are not taken into account. Nevertheless, the support is also suitable for such loads, in particular simultaneously. The heights of the individual components of the support extend parallel to the main loading, and the widths of the components extend perpendicularly to the direction of the main loading.

The supporting profile can be subdivided into three main sections, specifically the web section, the bottom section and the head section. The web section provides a sufficient geometrical height of the supporting profile in order thereby to increase the stiffness of the supporting profile, because the height (h) raised to the second power is included in the area moment of inertia of the sub-sections. Also arranged in the web section is the neutral axis about which the bending moment forms.

In a preferred embodiment with a weight loading and vertical falling flow, the foot section is designed to introduce the accepted loading into the plurality of bearers and to make a significant contribution to the bending resistance, preferably to accept the tensile stresses. In this case, the support rests on the bearers over parts of the bottom section. The head section then forms the contact element for the loading and makes the second significant contribution to the bending resistance. The head section preferably accepts the majority of the compressive stresses. For example, in the case of a weight loading, a mass, for example a packing through which a flow can pass, rests on the head section.

In order that the high area moment of inertia can be combined with a small coverage of a supported outlet area (for example for a liquid phase) or inlet area (for example for gas/vapor), for example of a packing, the head section has an upper side of a second width, running in particular along the longitudinal axis, and a sub-section in the form of an underside of a third width, which is preferably parallel to the upper side. The upper side is in this case directly facing the outlet area or inlet area. That is to say that preferably no further elements or constituents of the supporting profile extend upward from the upper side. The underside of the head section is facing away from the upper side.

The second and third widths of the head section may also be of the same size and at the same time smaller than the first width of the foot section.

Furthermore, there is also the possibility that the head section has over its extent in the vertical direction a (substantially) constant width, which is smaller than the first width of the bottom section, the second width and third width of the head section being smaller than the first width of the bottom section.

For example in the case of the use of a support with this supporting profile in a packing column for air separation, the vaporous constituents of the liquid air, boiling for example at approximately −180° C. [degrees Celsius], rise up in the packing column against the Earth's gravitational field as a result of their lower density, part of the vapor condensing on the surface of the at least one packing and dripping off. The condensate leaves at the outlet area, which rests (in particular at least indirectly) on the head section of the support. On account of the advantageous configuration of the supporting profile proposed here, the outlet area is only slightly covered and therefore allows good flowing away of the condensate and optimum impingement of the packing by the upwardly flowing vapors. At the same time, a high area moment of inertia with a small overall height is achieved.

The head section and the foot section are arranged lying opposite one another in the vertical direction, each at an assigned end of the web section. Particularly preferably, all three sections, that is to say the head section, the foot section and the web section, form a one-piece supporting profile (for example by continuous casting), and particularly preferably go over into one another optimally in terms of stress, for example over great transition radii.

As already explained above, the head section has a trapezoidal cross section (preferably made to extend perpendicularly to the longitudinal axis), the upper side of the head section correspondingly having a second width, which is less than the third width of the sub-section or the underside of the head section, the width of the head section decreasing continuously from the third width upward in the vertical direction to the second width in a way corresponding to the trapezoidal form of the cross section of the head section.

In the case of this refinement, the cross-sectionally trapezoidal head section consequently has two sides, converging from the bottom upward in the vertical direction, which connect the underside to the upper side of the head section. The upper side runs in the horizontal and parallel to the underside of the head section. In particular, the head section is formed mirror-symmetrically in relation to a vertical plane in which in particular the longitudinal axis of the support runs. The upper side is in particular—in the fitted state—facing an outlet area for a liquid, for example a liquid dripping off, and for example facing away from the incident flow of gas. The third width of the sub-section or on the underside of the head section is made as wide as possible, in order that the area of the head section is as large as possible without excessively increasing the overall height of the supporting profile, and consequently the contribution to the area moment of inertia of the supporting profile is as great as possible. The second width, on the other hand, is as small as possible, in order thereby to achieve a coverage in the region of the outlet area that is as small as possible.

According to a preferred embodiment of the support, the trapezoidal cross section of the head section can be supplemented upwardly in the vertical direction by an imaginary supplementary triangle to form a triangular cross section, the supplementary triangle having a height that corresponds to 0.8 to 1.2 times, particularly preferably one times, the maximum vertical height of a grid to be placed onto the support.

There is furthermore also the possibility that the head section may have a rectangular cross section, which preferably extends perpendicularly to the longitudinal axis of the support.

Furthermore, it may also be provided that the upper side of the head section is connected to the underside respectively by way of a convexly curved outer side (running along the vertical direction). Here there is therefore a sub-section that is made to extend horizontally between the upper side and the underside of the head section, has the maximum curvature and consequently marks the widest point of the head section. The third width of this sub-section is correspondingly wider than the second width of the upper side. The underside of the head section may have the same width here as the upper side.

According to a further preferred embodiment of the support, the foot section has at least one depression, which forms at least one drip nose on the foot bottom section. The at least one depression in the bottom section ensures that a liquid impinging on the support drips off at a predetermined point of the support and as far as possible does not collect on the side of the bottom section that is facing away from the web and drip off there in an uncontrolled manner. The at least one depression is in this case preferably designed in such a way that a sufficiently sharp edge is formed on an underside of the foot section directed downwardly when fitted, which prevents the liquid from flowing along the underside of the bottom section in adhesive contact and encourages it to come away. Particularly preferably, the at least one depression extends along a peripheral region or an edge of the underside of the foot section. Particularly preferably, the at least one depression extends over the entire length of the support.

According to a preferred embodiment of the support, it is provided that the web section has at least one strut, the at least one strut in particular having a greater vertical web height than horizontal web width. According to one embodiment, there is just one strut (the web section is consequently formed as a strut), the strut extending in the vertical direction from the foot section to the head section and thereby preferably extending away from the middle of the foot section and preferably adjoining the middle of the underside of the head section.

According to a further embodiment, it is provided that the web section is formed by a plurality of struts, preferably by two struts, the struts in particular having a greater vertical web height than horizontal web width. Preferably, the struts lie opposite one another in the horizontal direction and are spaced apart from one another in the horizontal direction, in particular the struts coming closer to one another as they extend in the horizontal direction from the foot section in the direction of the head section. In other words, the horizontal distance between the struts is smaller at the head section than at the foot section.

Distributing the area moment of inertia between a plurality of struts, preferably two struts, has the effect in particular of significantly increasing the transverse load stability. An increased transverse load stability also leads to a stiffening in the main loading direction.

Particularly preferably, the struts are formed mirror-symmetrically in relation to a vertical plane of symmetry. As a result, the internal stresses in the support are distributed as uniformly as possible. With an inclined alignment of the struts, in such a way that the struts converge in the upward direction (i.e. toward the head section), on the one hand good stability can be achieved and on the other hand good flowing away of a liquid toward the bottom section can be ensured.

According to a further embodiment of the support according to the invention, it is provided that the foot section is subdivided into two separate legs, which lie opposite one another in the horizontal direction, are spaced apart from one another and are respectively made to extend in particular along the longitudinal axis of the support and preferably are each connected to the head section by way of a strut of the web section, in particular the two webs coming closer to one another in the vertical direction toward the head section or running parallel to one another.

According to a preferred embodiment of the support, the supporting profile forms a trapezoidal form comprising the web section, the bottom section and the head section. In the case of this embodiment, the support does not form any outwardly protruding projections, so that good flowing away of a liquid impinging on the support from the head section to the bottom section is achieved. At the same time, with a low overall height, such a support is particularly stable.

According to a preferred embodiment of the support, at least one, preferably a number of and in particular all of the external corners of the supporting profile is/are rounded off. This avoids sharp external edges, that is to say sharp edges in the flow zone, so that continuous flowing away of liquid is encouraged, preferably up to a formed drip nose, where the liquid comes away at a predefined point and possibly falls into a set-up collecting device.

According to a further aspect of the invention, a packing column for the treatment of a fluid is proposed, having at least one treatment chamber, at least one grid, a plurality of supports according to the invention, and at least one packing through which a flow can pass vertically, the at least one packing resting on the at least one grid, and the at least one grid resting on the supports.

The packing column is designed for the treatment of a fluid, for example for air separation. In this case, an efficiency that is as high as possible is desired. The use of at least one support with the supporting profile described above has the effect that the overall height of the packing column can be reduced or, with the same height, the treatment zone can be extended, because such a support has a smaller height. In particular, it is possible to dispense with the costly introduction of slots in liquid collecting tanks lying thereunder by milling. In addition, good flowing away of a liquid out of a packing lying thereover is achieved, and in particular (excessive) coverage of packing channels is prevented.

Figure 2:
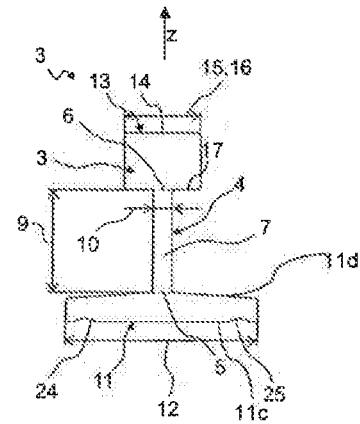
Figure 3:
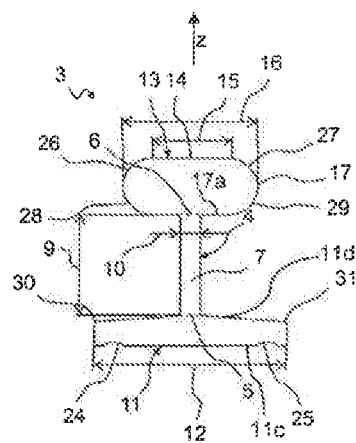
Figure 4:
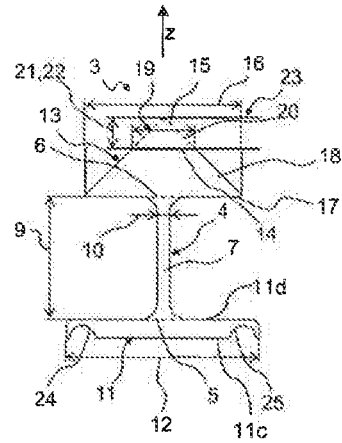
Figure 5:
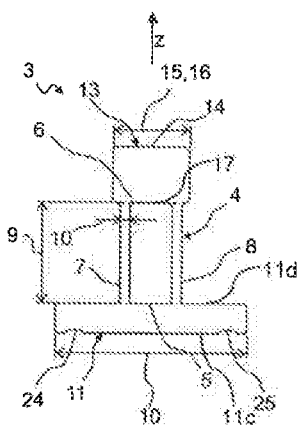
Figure 6:
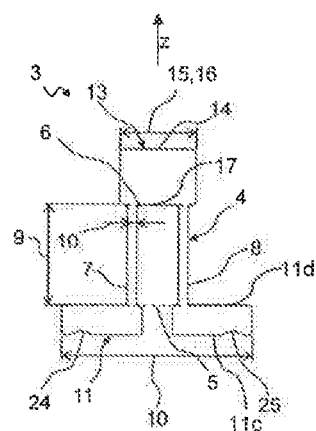
Figure 7:
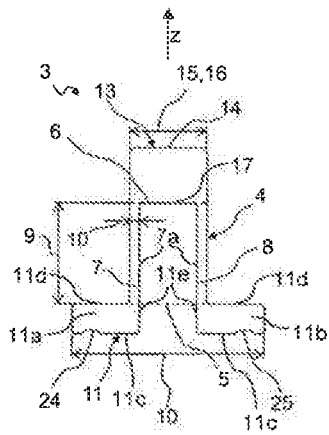
Figure 8:
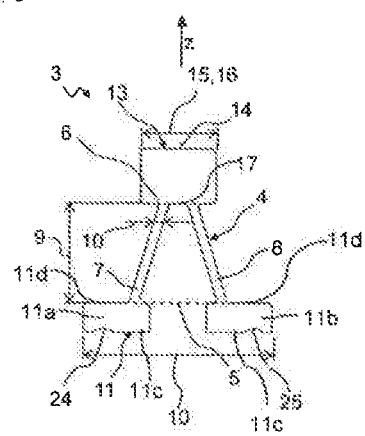

The invention described above is explained in detail below against the relevant technical background with reference to the associated drawings, which show preferred refinements. In the drawings:

FIG. 1 shows a support with a first single-strut supporting profile;

FIG. 2 shows a second single-strut supporting profile;
FIG. 3 shows a third single-strut supporting profile;
FIG. 4 shows a fourth single-strut supporting profile;
FIG. 5 shows a first two-strut supporting profile;
FIG. 6 shows a second two-strut supporting profile;
FIG. 7 shows a third two-strut supporting profile;
FIG. 8 shows a fourth two-strut supporting profile;
FIG. 9 shows a supporting profile in a trapezoidal form; and
FIG. 10 shows a packing column in section with supports according to the invention.

In FIG. 1, a support 1 with a first single-strut supporting profile 3 is represented. When used as intended, the support 1 preferably extends along a longitudinal axis L, which runs along the horizontal (this also applies to the supports represented in the other figures). The support 1 has furthermore a foot section 11, which is connected, in particular in one piece, to a head section 13 of the support 1 by way of a web section 4, which consists of a strut 7 that is made to extend in the vertical direction. The head section 13 has a second width 15 on the upper side 14 and a third width 16 on a sub-section 17 of the head section 13, which is preferably an underside 17 of the head section 13, the third width 16 being the same here as the second width 15. The upper side and the underside run parallel to one another along the longitudinal axis 42 and respectively lie in a horizontal plane. In the cross section shown, which is made to extend perpendicularly to the longitudinal axis 42, the head section 13 has a square or rectangular cross section. The foot section 11 preferably has a rectangular cross section, which likewise extends perpendicularly to the longitudinal axis. With a view to an optimum distribution of stress over the cross section, the cross-sectional area of the foot section 11 is preferably approximately the same size as the cross-sectional area of the head section 13. Since the maximum stress occurring depends greatly on the greatest distance from the neutral fiber, it is optimum in terms of stress to keep the neutral fiber, which runs through the overall centroid of the area, as far as possible in the middle of the profile cross section. With greater weighting of flow-related aspects, it may be appropriate that the cross-sectional area of the foot section 11 is up to more than twice the size of the cross-sectional area of the head section 13. In the case of rectangular cross sections, it is preferable for the horizontal width of the head or foot section 13, 11 to be greater than the vertical height.

With reference to a support 1 arranged as intended, the head section 13 lies perpendicularly above the foot section 11. The second width 15 and the third width 16 are significantly smaller than the first horizontal width 12 of the bottom section 11. Here, the width 12 is preferably more than 20% greater and, with greater weighting of the flow-related aspects than the stress-related aspects, more than twice as great as the widths 15, 16.

The web section 4 has a lower, first end 5, by way of which the web section 4 adjoins the middle of the foot section 11, and also an upper, second end 6, which lies opposite in the vertical direction z and by way of which the web section 4 adjoins the middle of the underside 17 of the head section 13.

The foot section 11 has furthermore on a downwardly facing underside 11d of the foot section 11 a concave first depression 24 and, parallel thereto and also concave, a second depression 25, which respectively form at least one drip nose. The loading direction for this support 1 runs from the top downward in the representation, which also applies to the supporting profiles 3 presented below. Furthermore, unless indicated otherwise, the cross sections described further below also respectively extend perpendicularly to the longitudinal axis of the respective support 1.

Furthermore, preferably the web height 9 of the web section 4 or the height of the strut 7 in the vertical direction is significantly greater than the web width 10 in the horizontal and thus creates a comparatively great distance between the head section 13 and the bottom section 11. The web height 9 is preferably at least four times as great as the web width 10.

The comparatively narrow (in the horizontal direction) head section 13 has the effect that the coverage for a resting outlet area of a packing is advantageously relatively small (cf. FIG. 10).

In FIG. 2, a supporting profile 3 with a foot section 11 that differs slightly from the supporting profile 3 represented in FIG. 1 is shown. The foot section 11 is designed here with a shallow upward incline to the web section 4. As a result, the stress profile improves, and moreover condensate is encouraged to flow away toward the outer edge of the foot section 1. The head section 13 may have a cross-sectional form according to FIG. 1. The same applies to the foot section 11, the upper side 11c of the foot section 11 falling away on both sides, resulting in corresponding differences from a purely rectangular cross section.

In FIG. 3, a further modification of the supporting profile 3 from FIG. 2 is shown, here the head section 13 assuming a maximum width 16 at half the height of the head section 13. Here, the sub-section 17 (in the form of a cross section of the head section 13 that is made to extend along the longitudinal axis of the support 1 and runs parallel to the upper side 14) is therefore located at half the height between the underside 17a of the head section 13 and the upper side 14 of the head section 13. The reason for this is that the head section 13 has two outer sides 40 facing away from one another, which connect the upper side 14 to the underside 17 and are respectively convexly curved (curved outward). The widths 15 of the underside 17a and the upper side 14 are the same. In other words, the head section has a rectangular cross section with rounded outer edges or corners 26 to 29, so that a semicircular cross-sectional contour of the head section 13 is obtained on the outer sides 40. As a result, a comparatively smooth deflection of the incident flow of the support 1 along the vertical z and also good characteristics for the flowing away of condensate are achieved. The fifth and sixth upper outer edges or corners 30 and 31 of the bottom section 11 are also slightly rounded off, in order to achieve good flowing away.

In FIG. 4, a further variant of the supporting profile 3 is shown, in which the head section 13 is formed with a trapezoidal cross section perpendicularly to the longitudinal axis of the support 1 (here the longitudinal axis of the support 1 runs perpendicularly to the plane of the sheet). The width of the head section 13 decreases continuously here from the underside 17 of the head section 13 (third width 16) toward the upper side 14 (second width 15), so that the said trapezoidal cross section of the head section 13 results. The third width 16 may in particular be twice or more than twice as great as the second width 15.

The head section 13 is formed here as a stump 18, which in the cross section shown can be supplemented by an imaginary supplementary triangle 20 to form a complete triangle 19. In this example, the height 21 of the supplementary triangle 20 in the vertical direction z corresponds to the vertical height of a grid 23 to be placed onto the upper side 14 of the head section 13.

Extending away from the middle of the underside 17 of the head section 13, which with the arrangement of the support 1 as intended lies in a horizontal plane, is the web section 4 or a single strut 7 forming the web section 4, which apart from a transitional region toward the foot section 11 and toward the head section 13 has a rectangular cross section, which is made to extend longitudinally in the vertical direction z. Furthermore, the strut 7 adjoins the middle of an upper side 11c of the foot section 11. On an underside 11d, facing away from the upper side 11c, the foot bottom section 11 has in turn running along the outer edges of the underside 11d concave depressions 24, 25, which each form a drip nose by way of which liquid can be discharged downward in a controlled manner. The depressions 24, 25 preferably extend parallel to one another over the entire length of the support 1.

FIG. 5 shows a support 1 similar to FIG. 1, as a difference from FIG. 1 the web section now being formed by two separate struts 7, 8, which are made to extend parallel to one another along the vertical direction z and respectively have a horizontal width 10 and a vertical height 9.

In FIG. 6, a variant of the supporting profile 3 according to FIG. 5 is represented, here the bottom section 11 being subdivided into two separate legs 11a, 11b, which run parallel to one another and lie opposite one another in the horizontal direction. Here, the one leg 11a is connected to the underside 17 of the head section 13 by way of the first strut 7 and the other leg 11b is connected to the underside 17 of the head section 13 by way of the second strut 8.

In FIG. 7, a further variant of the supporting profile 3 according to FIG. 6 is shown, there not being any undercut here between the struts 7 and 8 and the head section 13 at the second end 6 of the web section 4, so that favorable characteristics for the flowing away of condensate from the top downward are obtained here. Likewise, the outer sides 7a facing one another of the struts 7, 8 respectively go over flush into an adjoining outer side 11e of the respectively assigned leg 11a, 11b, which likewise improves the flowing away characteristics of the support 1.

In FIG. 8, a support 1 with a supporting profile 3 is shown, in which as a difference from FIG. 6 the two struts 7, 8 converge from the respective leg 11a, 11b toward the head section 13, so that a horizontal distance between the struts 7, 8 is reduced from the bottom upward.

In FIG. 9, furthermore, a support 1 according to the invention with a supporting profile 3 of a trapezoidal form is shown. Here, the head section 13 is formed trapezoidally in cross section, producing two outer sides 40 of the head section 13 that diverge from the top downward (and face away from one another), which go over flush into a respective strut 7, 8, which likewise diverge downward, so that a horizontal distance between the two struts 7, 8 increases from the top downward in the vertical direction. The outer sides facing away from one another of the two struts 7, 8 respectively go over flush into an outer side 41 of the foot section 11 (the outer sides 41 of the foot section 11 facing away from one another), so that this likewise forms a trapezoid in cross section (apart from existing depressions 24, 25, see below). This results overall in a trapezoidal cross-sectional contour of the supporting profile 3 as a whole. This brings about a comparatively high stiffness and also favorable characteristics for the flowing away of condensate.

Finally, in FIG. 10 a packing column 2 is shown in section, fluid 32, which is often in a two-phase or gaseous state, rising up therein and at least partially passing a first packing 36 and a second packing 37. The packings 36 and 37 form (respectively) a treatment chamber 33, in which part of the fluid 32 condenses on the surfaces and flows off. Here there can be seen in the case of the second packing 37 a collecting channel 38, which is designed for collecting a precipitated liquid. The first packing 36 rests on a first grid 23, which in turn is supported by a first support 1, generally a plurality of first supports, according to the invention with a first supporting profile 3, which in turn rests on a bearer 39. The second packing 37 rests on a second grid 34, which in turn rests on a further support 35. Such a packing column 2 can be used for example for separating air, the fluid being boiling air or a further fractionation stage.

With the support proposed here, a reduced supporting height can be realized with at the same time small coverage.

The invention claimed is:

1. A support for a packing column, said support comprising: a supporting profile having:
   a web section running in the vertical direction which has a first lower end and a second upper end, the web section having a greater vertical extent than horizontal extent,
   a foot section of a first width, the foot section adjoining the first lower end of the web section,
   a head section, which adjoins the second upper end of the web section, the head section having an upper side of a second width, and the head section having an underside of a third width,
wherein the head section has a trapezoidal cross section, and wherein the second width is less than the third width.

2. The support as claimed in claim 1, wherein the second width of the upper side of the head section is less than the first width of the foot section.

3. The support as claimed in claim 1, wherein the trapezoidal cross section of the head section can be supplemented upwardly in the vertical direction by an imaginary supplementary triangle to form a triangular cross section, the supplementary triangle having a height that corresponds to 0.8 to 1.2 times the maximum vertical grid height of a grid to be placed on.

4. The support as claimed in claim 1, wherein the foot section has at least one depression which forms at least one drip nose on the foot section.

5. The support as claimed in claim 1, wherein the web section has at least one strut, said at least one strut having a vertical height that is greater than the horizontal width of said at least one strut.

6. The support as claimed in claim 1, wherein the web section is formed by a plurality of struts.

7. The support as claimed in claim 6, wherein the struts lie opposite one another in the horizontal direction and are spaced apart from one another in the horizontal direction.

8. The support as claimed in claim 6, wherein the foot section is subdivided into two separate legs, which lie opposite one another in the horizontal direction, are spaced apart from one another, and are each connected to the head section by way of a strut of the web section.

9. The support as claimed in claim 6, wherein the foot section is subdivided into two separate legs, which lie opposite one another in the horizontal direction, are spaced apart from one another, and are each connected to the head section by way of one of said struts of said web section.

10. The support as claimed in claim 1, wherein at least one of the external outer edges of the supporting profile is/are rounded off.

11. A packing column comprising:
   at least one treatment chamber, at least one grid, a plurality of supports, and at least one packing through which a flow can pass vertically, the at least one packing resting on the at least one grid, and the at least one grid resting on the supports, wherein the supports are supports according to claim 1.

12. The support as claimed in claim 1, wherein the trapezoidal cross section of the head section can be supplemented upwardly in the vertical direction by an imaginary supplementary triangle to form a triangular cross section, the supplementary triangle having a height that corresponds to 1.0 to 1.2 times the maximum vertical grid height of a grid to be placed on.

13. The support as claimed in claim 1, wherein the trapezoidal cross section of the head section can be supplemented upwardly in the vertical direction by an imaginary supplementary triangle to form a triangular cross section, the supplementary triangle having a height that corresponds to 0.8 to 1.0 times the maximum vertical grid height of a grid to be placed on.

14. A support for a packing column, said support comprising:
   a web section having a first lower end and a second upper end, wherein said web section is formed by a plurality of struts, each strut having a vertical height that is greater than the horizontal width of the strut, wherein the struts come closer to one another in the vertical direction toward the second upper end of the web section,
   a foot section of a first width, the foot section adjoining the first lower end of the web section,
   a head section, which adjoins the second upper end of the web section, the head section having an upper side of a second width, and the head section having an underside of a third width,
      wherein the head section has a trapezoidal cross section, and wherein the second width is less than the third width.

15. The support as claimed in claim 14, wherein said web section is formed by two of said struts.

16. The support as claimed in claim 14, wherein the foot section is subdivided into two separate legs, which lie opposite one another in the horizontal direction, are spaced apart from one another, and are each connected to the head section by way of one of said struts of said web section.

17. The support as claimed in claim 14, wherein the second width of the upper side of the head section is less than the first width of the foot section.

18. The support as claimed in claim 14, wherein the supporting profile of said support forms a trapezoidal form comprising the web section, the foot section and the head section.

19. The support as claimed in claim 14, wherein the trapezoidal cross section of the head section can be supplemented upwardly in the vertical direction by an imaginary supplementary triangle to form a triangular cross section, the supplementary triangle having a height that corresponds to 0.8 to 1.2 times the maximum vertical grid height of a grid to be placed on.

20. The support as claimed in claim 14, wherein the foot section has at least one depression which forms at least one drip nose on the foot section.

21. The support as claimed in claim 14, wherein at least one of the external outer edges of the supporting profile of the support is/are rounded off.

22. A packing column comprising:
   at least one treatment chamber, at least one grid, a plurality of supports and at least one packing through which a flow can pass vertically, wherein at least one packing rests on said at least one grid, and said at least one grid resting on the supports, wherein said supports are supports according to claim 14.

* * * * *